March 16, 1937. V. W. KLIESRATH 2,073,872
VEHICLE
Filed Aug. 28, 1933 3 Sheets—Sheet 1
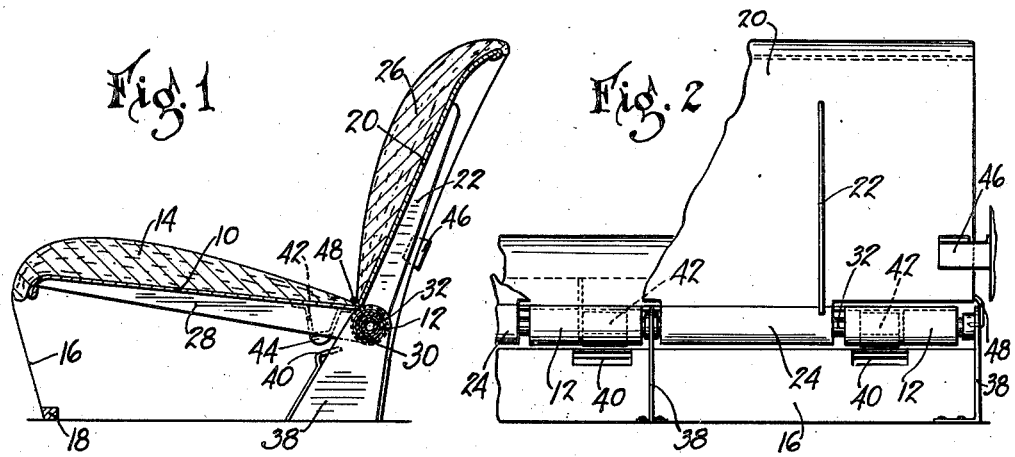
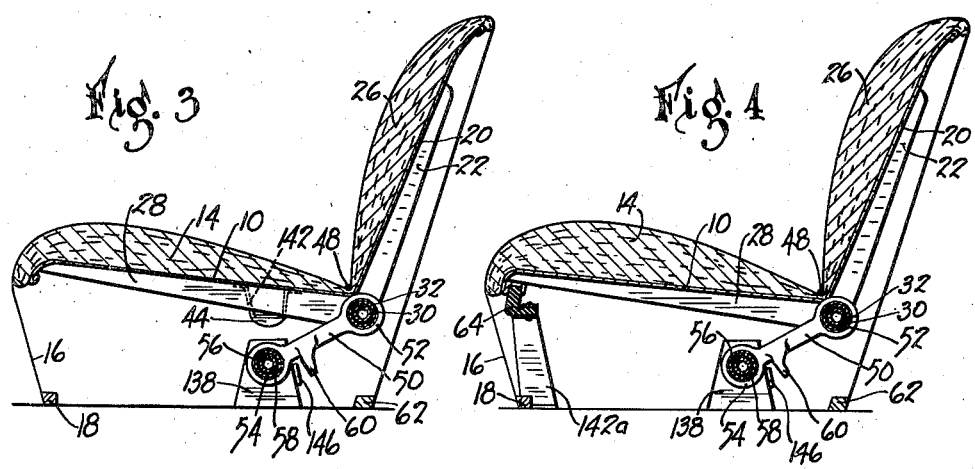
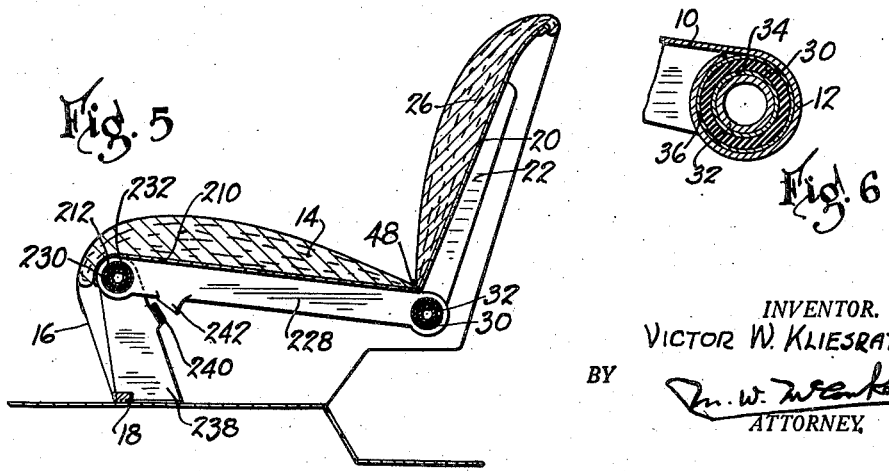
INVENTOR.
VICTOR W. KLIESRATH
BY
ATTORNEY.

March 16, 1937. V. W. KLIESRATH 2,073,872
VEHICLE
Filed Aug. 28, 1933 3 Sheets-Sheet 2
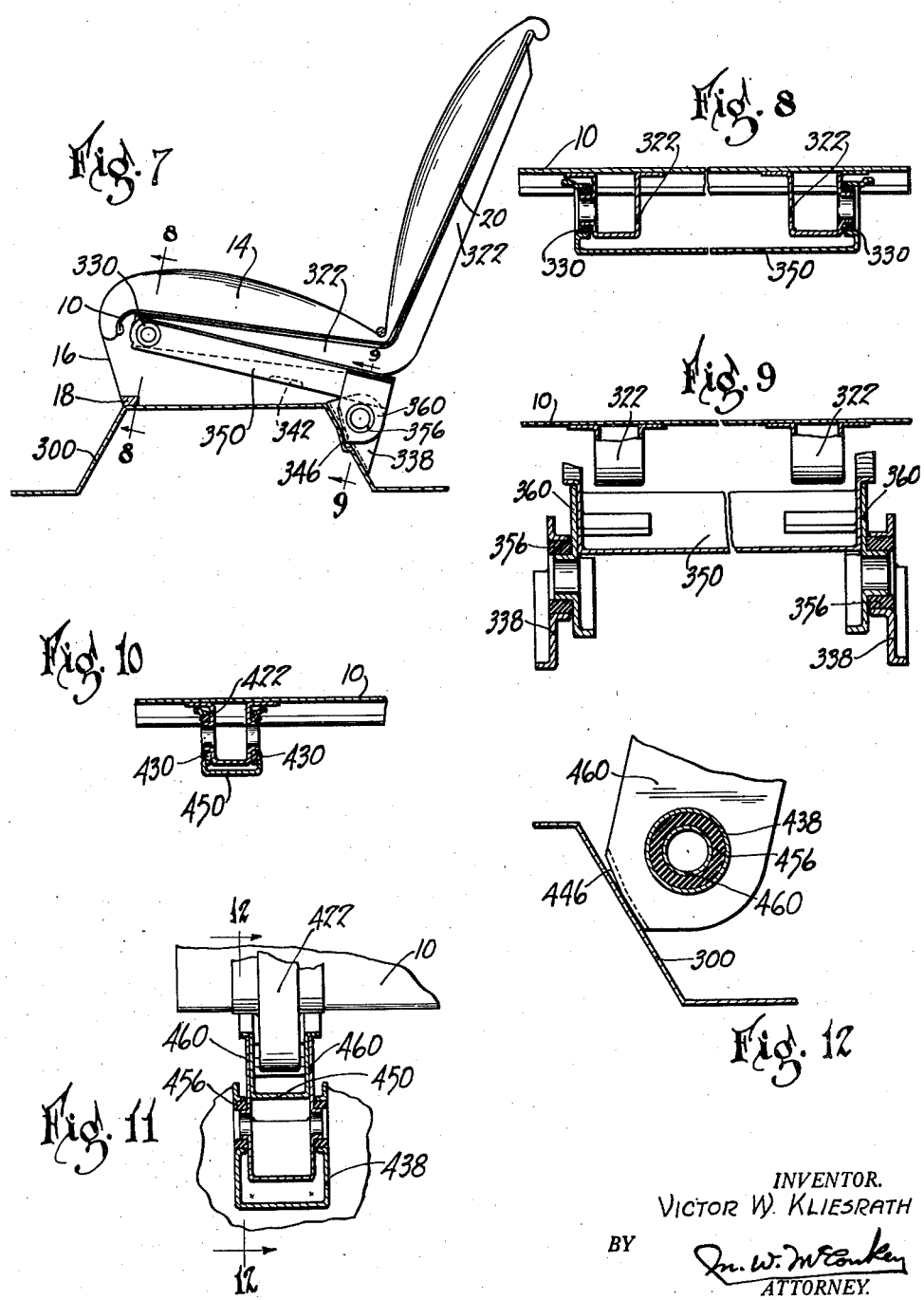
INVENTOR.
VICTOR W. KLIESRATH
BY
ATTORNEY.

March 16, 1937. V. W. KLIESRATH 2,073,872
VEHICLE
Filed Aug. 28, 1933   3 Sheets-Sheet 3
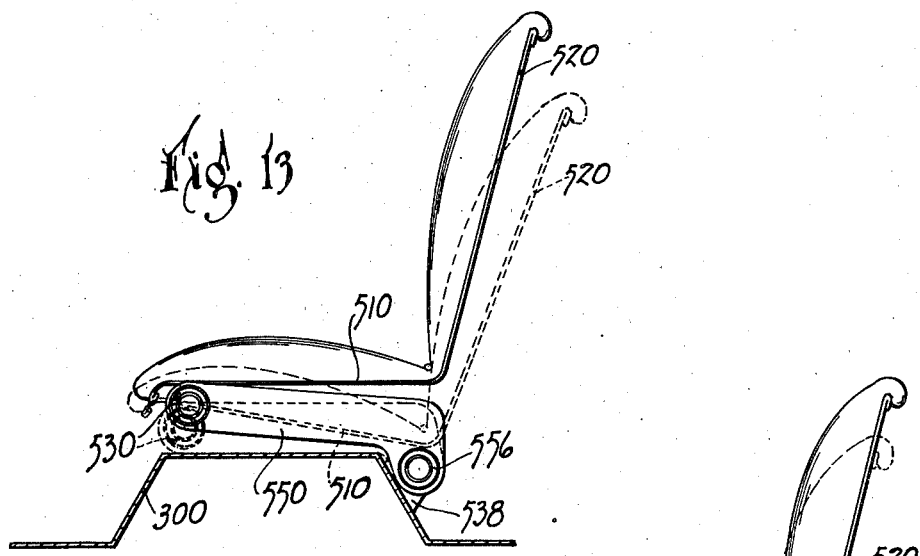
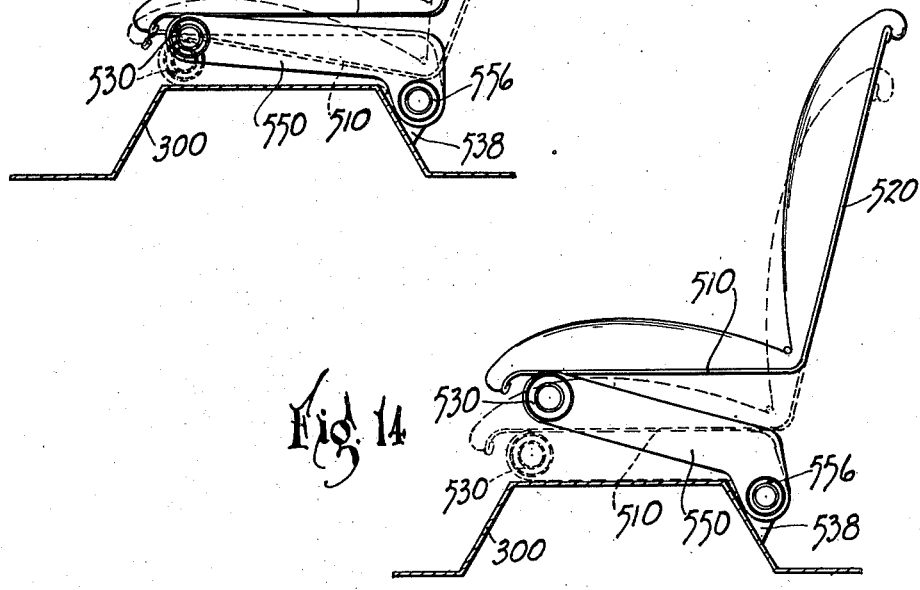
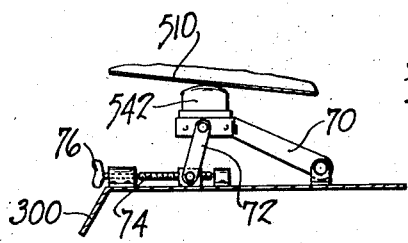
INVENTOR.
VICTOR W. KLIESRATH
BY
ATTORNEY.

Patented Mar. 16, 1937

2,073,872

UNITED STATES PATENT OFFICE 2,073,872

VEHICLE

Victor W. Kliesrath, South Bend, Ind., assignor to The Steel Wheel Corporation, Chicago, Ill., a corporation of New York Application August 28, 1933, Serial No. 687,056

11 Claims. (Cl. 155—50)

This invention relates to seats, and is illustrated as embodied in a novel seat for an automobile or the like. An object of the invention is to reduce or eliminate the need for spring structures in the seat proper, and thereby to reduce the necessary height of the seat, by providing a novel yielding support for the seat, and preferably also an independent yielding support for the seat back.

In one desirable arrangement, rubber bushings or blocks or the like are arranged to take the load of the seat or the back and to transmit it, preferably by torsional yielding, to suitable supports. In the arrangement illustrated, the rubber bushings are sleeved on and preferably vulcanized or otherwise interiorly bonded to a suitably-supported transverse element, and are seated in and preferably exteriorly bonded to bearings carried by the seat or the back, whereby the load is taken by the torsional yielding of the bushings.

If desired, the effect may be compounded by supporting the above-described transverse element on movable arms or brackets which in turn are yieldingly mounted. I prefer to do this by forming the movable brackets with upper bearings embracing and bonded to some of the rubber bushings adjacent the seat, to yieldingly support the transverse element which yieldingly carries the seat.

Preferably the brackets are also formed with lower bearings embracing and bonded to certain ones of a second series of rubber bushings, others of which are similarly mounted in bearings formed on stationary brackets or the like, and all of which are sleeved on and interiorly bonded to a second transverse element, so that angular movement of the movable bracket is resisted by torsional yielding of the second series of bushings.

In another desirable arrangement, the second series of bushings directly supports the seat, while the first series yieldingly connects the seat and its back.

Other features of novelty relate to means such as novel bumpers for limiting the relative movement of the parts as the bushings yield under torsion, and to other novel combinations and particular constructions which will be apparent from the following description of the illustrative embodiments shown in the accompanying drawings, in which:

Figure 1 is a vertical section through one type of seat;

Figure 2 is a partial rear elevation, partly broken away, of the seat of Figure 1;

Figures 3, 4, and 5 are sections, corresponding to Figure 1, through different types of seats;

Figure 6 is a detail section showing one of the above-described bushings;

Figure 7 is a section corresponding to Figure 1, but showing a modified arrangement;

Figure 8 is a section through this modification, on the line 8—8 of Figure 7;

Figure 9 is a section through the same on the line 9—9 of Figure 7;

Figure 10 is a view corresponding to part of Figure 8, but showing a different manner of attaching to the seat;

Figure 11 is a view corresponding to part of Figure 9, and showing how the modification of Figure 10 may be mounted on the base;

Figure 12 is a section on the line 12—12 of Figure 11, and corresponding to the lower right-hand portion of Figure 7, but showing the modification of Figures 10 and 11;

Figures 13 and 14 show a further modification; and

Figure 15 shows how an adjustable bumper may be used if desired.

In the arrangement shown in Figure 1, the seat may be a steel stamping 10, formed with eyes providing alined cylindrical coaxial bushings 12 at its rear edge, and covered with suitable padding 14 and a fabric or other covering 16 which is shown continued to the floor and secured to a transverse cleat or the like 18.

The seat back is preferably a steel stamping 20, which may be suitably reinforced and stiffened by welding bracket members 22 to its rear face, and which is formed with eyes providing cylindrical alined coaxial bearings 24 at its lower edge. The back also has suitable padding 26 and the covering 16 is continued upwardly over this padding and secured to the rear face of the back in any desired manner. The seat 10 may also have reinforcing and stiffening members 28 welded to its lower face if desired.

The bearings 12 and 24 are arranged in coaxial alinement, and in accordance with an important feature of the invention they embrace and are vulcanized or otherwise surface bonded to the exterior of a series of rubber bushings 30. These bushings are sleeved on, and preferably interiorly bonded to, a transverse element such as a hollow steel tube 32.

For convenience of manufacture, and as shown in Figure 6, each bushing 30 may be interiorly and exteriorly vulcanized or otherwise surface bonded to inner and outer steel bushings 34 and 36, which in turn may be welded or otherwise secured to the transverse element 32 and to the bearings 12 and 24, thereby eliminating any vulcanizing operation in assembling the seat.

In Figures 1 and 2, the transverse element 32 is rigidly carried by a series of brackets or the like 38 mounted on the floor of the car. These brackets are shown with abutments 40 pressed out for limiting engagement with bumpers 42 faced with rubber blocks 44 and secured to the seat 10. Movement of the back 20 is limited by a U-shaped spring bumper 46 secured to each wall of the car. The covering 16 is shown held, at the joint between the seat and the back by means of such as a wire 48 having its ends turned over and hooked into the ends of the tube 32.

It will be seen that a very compact structure is provided, with the seat and the back yieldingly and independently mounted on the transverse element 32 (held in this case by brackets 38), and movable against the yielding torsional resistance of the bushings 30.

In Figure 3, this effect is compounded, by yieldingly mounting the transverse element 32 on movable brackets or arms or the like 50, which in turn are yieldingly mounted on brackets or other supports 138. In the arrangement illustrated, the opposite ends of the movable brackets 50 are formed with cylindrical bearings 52 and 54.

The upper bearings 52 embrace, and are preferably bonded (directly or by welding to the extra steel bushings 36) to, certain ones of the rubber bushings 30. The lower bearings 54 embrace, and preferably are similarly bonded to, rubber bushings 56 which in turn are sleeved in a coaxial series on, and preferably are interiorly bonded to, a second transverse element such as another steel tube 58. Others of the rubber bushings 56 are embraced by, and are exteriorly bonded to, bearings formed in the stationary brackets 138.

In this case, the seat is provided with bumpers 142 adapted to engage the tops of brackets 138, while the movable brackets 50 may have abutments 60 adapted to engage rubber blocks 146 mounted on the brackets 138. In this case, also, the covering 16 is shown extended across the back of the seat assembly, and secured to a cleat 62 on the floor.

As shown in Figure 4, in lieu of the bumpers 142 there may be a stationary bracket, or a plurality of brackets, 142a under the front edge of the seat, and preferably flexibly connected thereto by means such as a sheet of rubber 64.

In the arrangement of Figure 5, the transverse element 32 and its bushings 30 form a yielding connection between seat 210 and back 20. Some of the reinforcements of seat 210 are in the form of arms 228 having bearings at opposite ends embracing and bonded to certain of the rubber bushings.

In this case, however, the front edge of the seat 210 is formed with bearings 212 embracing, and preferably bonded to, rubber bushings 230 which in turn are sleeved on and may be interiorly bonded to a second transverse element such as a steel tube 232 carried by stationary brackets 238. Brackets 238 may hold element 232 rigidly, or may have bearings embracing and bonded to certain of the rubber bushings 230. Members 228 may have bumpers 242 engaging rubber-faced abutments 240 on brackets 238.

In the modification of Figures 7, 8, and 9, channel-shaped stamped steel ribs 322 spot-welded or otherwise secured to the seat back are connected by inner-and-outer bonded rubber bushings 330 to a pivoted base or bracket 350, also stamped from sheet steel. The bracket 350 in turn is connected by similarly-bonded rubber bushings 356 to the base or floor-board, which has an elevated trapezoidal rib 300 to support the seat, by means of stationary brackets 338 welded or otherwise secured to the rear face of the rib 300.

The bushings 356 are bonded externally and internally respectively to sleeves drawn integrally on the stationary brackets 338 and on stamped bumper brackets 360 welded to the sides of the pivoted bracket 350. The brackets 360 have, as shown in Figure 7, bumper or limiting surfaces engaging at the limits of seat movement corresponding surfaces 346 formed on the rib 300.

In the modification of Figures 10, 11, and 12, seat-supporting ribs 422 (corresponding to ribs 322 in Figures 7–9) are formed with integrally-drawn sleeves on both sides (instead of one side only as in Figure 8), these sleeves being bonded to pairs of rubber bushings 430 which in turn are bonded to similarly-drawn sleeves formed on stamped steel movable bracket arms 450.

The arms 450 at their lower ends are connected, by stamped steel members 460 welded thereto, and by pairs of rubber bushings 456 respectively internally and externally bonded to sleeves integrally drawn on members 460 and on stationary stamped steel brackets 438 mounted the same as brackets 338. In this case, however, the limiting surfaces or bumpers 446 are formed on members 460 (instead of on rib 300) and engage the straight inclined rear face of rib 300.

The modification shown in Figures 13 and 14 includes a seat 510—520 mounted at its front edge by means of bonded rubber bushings 530 on the front ends of arms 550 overlying the trapezoidal rib 300. The rear ends of the arms 550 are bent downwardly and connected by bonded rubber bushings 556 to brackets 538 welded to the rear face of the rib 300.

The bushings 530 and 556 are selected according to what is desired in the motion of the seat. If the bushings 530 yield more easily than the bushings 556, then the seat will, under load, first yield from full-line position to the dotted-line position of Figure 13, and then in a second stage of movement will yield from the dotted-line position of Figure 13 to the dotted-line position of Figure 14. If the bushings 556 yield before bushings 530, the seat will first tilt forward slightly as the arms 550 move down, and will then move down and back to the dotted-line position of Figure 14. If the bushings 530 and 556 all yield at the same time, the seat will move down in almost a straight-line motion from the full-line position to the dotted-line position in Figure 14.

Figure 15 shows one method of making the seat bumpers adjustable. In this arrangement each bumper 542 is supported on a pivoted lever 70 and a thrust link 72, the link being adjustable by means of a threaded member 74 passing through a nut mounted on the bottom of the link, and which is manipulated by a handle or the like 76.

While several illustrative embodiments have been described in detail, it is not my intention to limit the scope of the invention by that description, or otherwise than by the terms of the appended claims.

I claim:

1. A seat having bearings, movable supports having bearings coaxially alined with the seat bearings, a transverse element smaller than said bearings and passing through the alined bearings, rubber bushings sleeved on said element and seated in said bearings and interiorly bonded to said element and exteriorly bonded to said bearings, said movable supports having bearings also at the ends opposite said coaxially alined bearings, brackets having bearings coaxially alined with the bearings in said opposite ends, a second transverse element passing through said last-named coaxially-alined bearings, and rubber bushings sleeved on said second element and interiorly bonded thereto, and which are seated in said last-named coaxially-alined bearings and exteriorly bonded thereto.

2. A seat having bearings, movable supports having bearings coaxially alined with the seat bearings, a transverse element smaller than said bearings and passing through the alined bearings, rubber bushings sleeved on said element and seated in said bearings and interiorly bonded to said element and exteriorly bonded to said bearings, said movable supports having bearings also at the ends opposite said coaxially alined bearings, brackets having bearings coaxially alined with the bearings in said opposite ends, a second transverse element passing through said last-named coaxially-alined bearings, and rubber bushings sleeved on said second element and interiorly bonded thereto, and which are seated in said last-named coaxially-alined bearings and exteriorly bonded thereto, together with means for limiting the movement of the above-recited parts due to torsional yielding of the bushings.

3. A seat and a back therefor having coaxial alined bearings, a transverse element passing through the alined bearings, and separate rubber bushings sleeved on and interiorly bonded to said element and which are respectively seated in and exteriorly bonded to said bearings, whereby said seat and said back are independently yieldingly supported by said element through the torsional resistance of said bushings and means for supporting said element and for resisting rotation thereof.

4. A seat and a back therefor having coaxial alined bearings, a transverse element passing through the alined bearings, and separate rubber bushings sleeved on and interiorly bonded to said element and which are respectively seated in and exteriorly bonded to said bearings, whereby said seat and said back are yieldingly connected by said element through the torsional resistance of said bushings, together with means for yieldingly supporting said seat and through said seat yieldingly supporting said back.

5. A seat and a back therefor having coaxial alined bearings, a transverse element passing through the alined bearings, means for supporting and resisting rotation of said transverse element and separate rubber bushings sleeved on and interiorly bonded to said element and which are respectively seated in and exteriorly bonded to said bearings, whereby said seat and said back are independently yieldingly supported by said element through the torsional resistance of said bushings.

6. A seat and a back therefor having coaxial aligned bearings, movable arms having bearings at one end thereof aligned with the seat and back bearings, a transverse element passing through the alined bearings, rubber bushings sleeved on said element and interiorly bonded thereto and seated in said bearings and exteriorly bonded thereto, whereby said seat and said back are independently yieldingly supported by said element through said bushings, said movable arms having bearings also at the ends opposite said coaxially alined bearings, brackets having bearings coaxially alined with the bearings in said opposite ends, a second transverse element passing through said last-named alined bearings, and rubber bushings sleeved on said second named element and interiorly bonded thereto and seated in said last-named alined bearings and exteriorly bonded thereto.

7. In a chair, a tiltable back member, a support for said tiltable back member supporting said tiltable back member for tilting movement about a horizontal axis, and resilient means providing resilient support for said tiltable back member comprising a pair of cylindrical bearing elements one of which is on said tiltable back member and rigid therewith and the other of which is adapted to be rotatively displaced relative to said first bearing element upon tilting movement of said tiltable back member, said bearing elements being arranged one within the other in coaxial relation, and a rubber sleeve between said bearing elements interiorly bonded to the inner bearing element and exteriorly bonded to the outer bearing element and a substantially horizontal seat member mounted independently of and adjacent to the back member, said seat member being unaffected by tilting movement of the back member.

8. In a chair a tiltable back member having a bearing element, a second bearing element coaxial with and cooperating with said first named bearing element, means for supporting said second bearing element, a rubber bushing bonded to said bearing elements and arranged to yield torsionally when said back member is tilted and a substantially horizontal seat member mounted independently of and adjacent to the back member, said seat member being unaffected by tilting movement of the back member.

9. In a chair a tiltable back member having a bearing element, a second bearing element concentric with and cooperating with said first named bearing element, and a rubber bushing bonded to said bearing elements and arranged to yield torsionally when said back member is tilted, a rigid support, and arms yieldingly mounted thereon and connected to said second bearing element.

10. In a chair, a tiltable back member having a cylindrical bearing secured thereto, a support having bearings alined with said back bearing, a transverse element passing through the alined bearings, and rubber bushings sleeved on said element and interiorly bonded thereto and seated in said bearings and exteriorly bonded thereto.

11. In a chair a tiltable back member having a cylindrical bearing secured thereto, a movable arm having a bearing at one end thereof alined with said back bearing, a transverse element passing through said alined bearings, rubber bushings sleeved on said element and interiorly bonded thereto and seated in said bearings and exteriorly bonded thereto, said movable arm having a bearing also at the end opposite said coaxially alined bearings, a bracket having a bearing coaxially alined with the bearing in said opposite end, a second transverse element passing through said last named coaxially alined bearings, and rubber bushings sleeved on said second element and interiorly bonded thereto and seated in said last named alined bearings and exteriorly bonded thereto.

VICTOR W. KLIESRATH.